Figure 1:
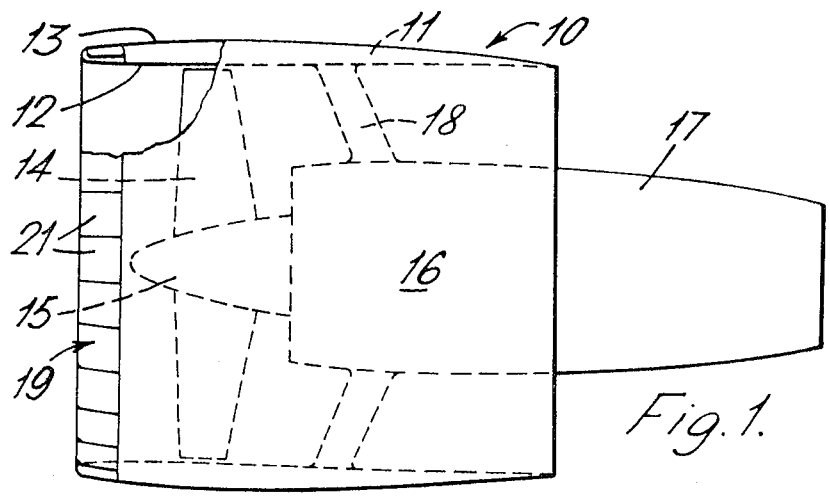

United States Patent

[11] 3,623,494

[72] Inventor Michael Poucher
 Duffield, England
[21] Appl. No. 77,638
[22] Filed Oct. 2, 1970
[45] Patented Nov. 30, 1971
[73] Assignee Rolls-Royce Limited
 Derby, England
[32] Priority Oct. 3, 1969
[33] Great Britain
[31] 48,809/69

[54] AIR INTAKES FOR GAS TURBINE ENGINES
 8 Claims, 5 Drawing Figs.
[52] U.S. Cl............................................... 137/15.2
[51] Int. Cl...............................................F02b 27/02,
 F02r 11/00
[50] Field of Search........................................... 137/15.2,
 15.1; 138/45, 44

[56] References Cited
 UNITED STATES PATENTS
 2,948,111 8/1960 Nelson ......................... 137/15.1 UX
 3,532,129 10/1970 Ward............................ 137/15.1 X
Primary Examiner—A. Cohan
Attorney—Cushman, Darby & Cushman ABSTRACT: The invention concerns an air intake for a gas turbine engine including an upstream lip which is movable relative to a fixed pod member, displaceable pressure-responsive means associated with the said lip and subjected to opposing forces respectively due to the static pressure within the said intake and to ambient air pressure, the displacement of said pressure-responsive means causing movement of said lip to vary the contraction ratio of the said intake automatically and solely in response to the relative magnitudes of said pressures.

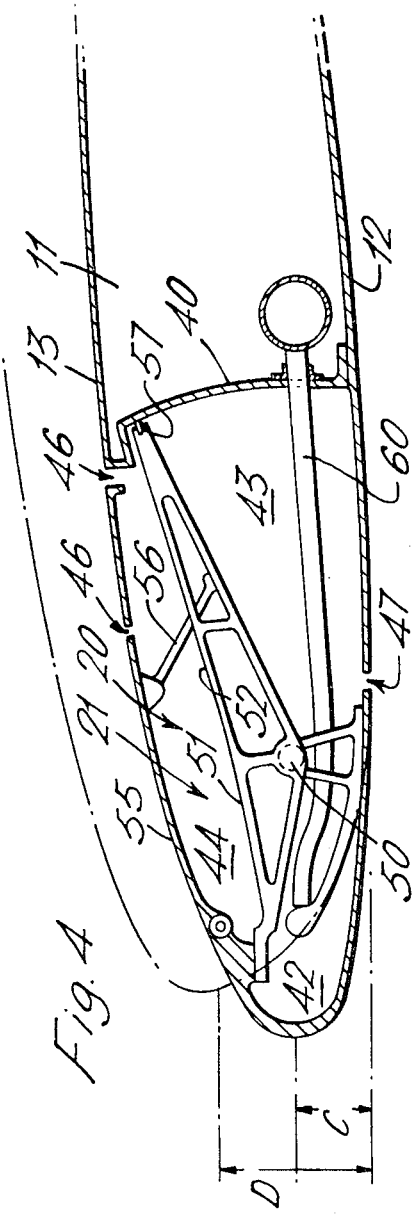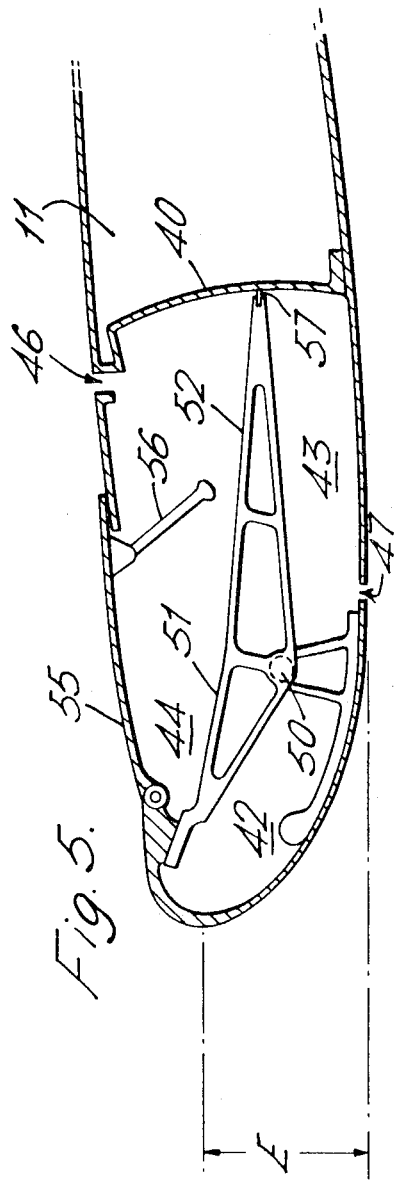

AIR INTAKES FOR GAS TURBINE ENGINES

This invention relates to an air intake for a gas turbine engine, and although it is in no way so restricted, it will be particularly described with reference to a gas turbine engine of the front fan type.

Front fan power plants are well known and comprise a gas turbine gas generator or main engine of a given diameter upstream of which is located a relatively slow-moving fan which is mounted in a fan pod of larger diameter than the casing of the gas generator. Such front fan engines have been very successful but with the general development of aircraft provided with such engines, the problem arose of reducing their weight and/or size, these factors being vital in aero engine and aircraft design.

However, if the outer diameter of a fan pod is reduced to reduce the cross-sectional area and weight of the fan pod, while maintaining the intake wall profile constant, a much sharper lip will be produced, which in effect means a reduction of the contraction ratio of the engine. As is well known, the contraction ratio is defined as the ratio of the perpendicular distances from the longitudinal centerline of the engine to the highlight point (the most upstream point) and to the throat (i.e. the location of the minimum internal diameter of the intake) of the fan pod structure. This reduction of the contraction ratio is, however, highly undesirable because a sharp lip can create areas of low pressure with consequent asymmetric intake flows and bad distribution of air at the face of the fan rotor in certain flying conditions such as taking-off or landing or maneuvering in flight in a crosswind. It will be appreciated that if the general direction of the air flow makes an angle with the longitudinal centerline of the power plant, a portion of the intake lip will "shadow" a region of the interior of the intake in which region a low-pressure zone will be setup and wherein the air flow does not attach itself properly to the intake wall.

The present invention seeks to provide an intake in which the outer wall is of reduced diameter and yet the above-mentioned consequential disadvantages are substantially reduced or eliminated.

Although the present invention relates to any novel integer or combination of integers, herein described and/or shown in the accompanying drawings, and is in no way restricted by the following statements, nevertheless in one aspect thereof it provides an air intake for a gas turbine engine including an upstream lip which is movable relative to a fixed pod member, there being displacable pressure-responsive means associated with the said lip and disposed so that in operation it is subjected to opposing forces respectively due to the static pressure within the said intake and to ambient air pressure, the arrangement being such that displacement of said pressure-responsive means causes movement of said lip to vary the contraction ratio of the said intake automatically and solely in response to the relative magnitudes of said pressures.

In one preferred embodiment, the lip is pivotally connected to said fixed pod member for movement between an inoperative position wherein respective adjacent surfaces of the lip and of the fixed pod member are substantially contiguous, and an operative position wherein the lip is moved in an upstream direction with a radially inward component so as simultaneously to increase the said contraction ratio and to form a gap between itself and the fixed pod member, the said gap serving as an auxiliary intake.

The pressure responsive means is preferably constituted by a generally radially extending surface of the said lip, which surface in said inoperative position is contiguous with a generally radially extending surface of said fixed pod member, there being resilient means for urging the said lip towards its inoperative position.

The pivotal connection between the said lip and the fixed pod member may include a roller and track arrangement, and struts connected between the rollers and the lip.

Preferably the resilient means is a spring anchored at one end to said fixed pod member and connected at the other end to a part movable with the rollers.

In another preferred embodiment of the present invention, the lip is provided or associated with a flexible wall and defines within itself a pair of spaces which are respectively subjected in operation to said pressures and which are separated from each other by the pressure-responsive means constituted by a movable piston connected to said flexible wall, whereby movement of said piston in response to a difference in said pressures causes flexing of said flexible wall to change the said contraction ratio.

The piston may be a rocking piston one end of the working face of which is in sealing engagement with a generally radial face of the upstream end of the fixed pod member, while the other end of said working face is connected to said lip.

The lip preferably comprises a plurality of circumferentially adjacent segments which can move relative to one another to permit the intake to assume an asymmetric shape.

The scope of the invention also includes a gas turbine engine provided with an air intake as set forth above, and the said engine is preferably a front fan engine.

Figure 2:
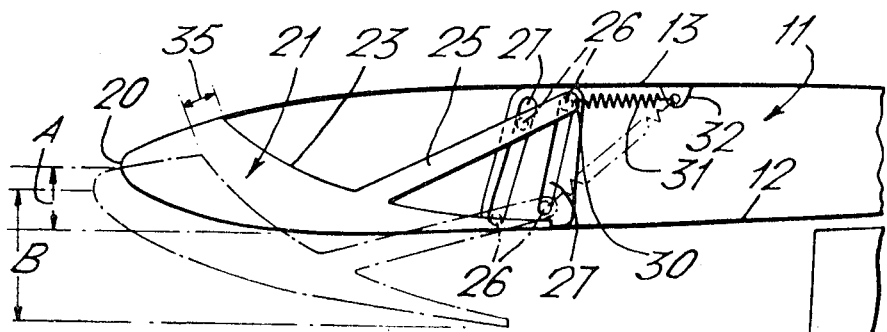
Figure 3:
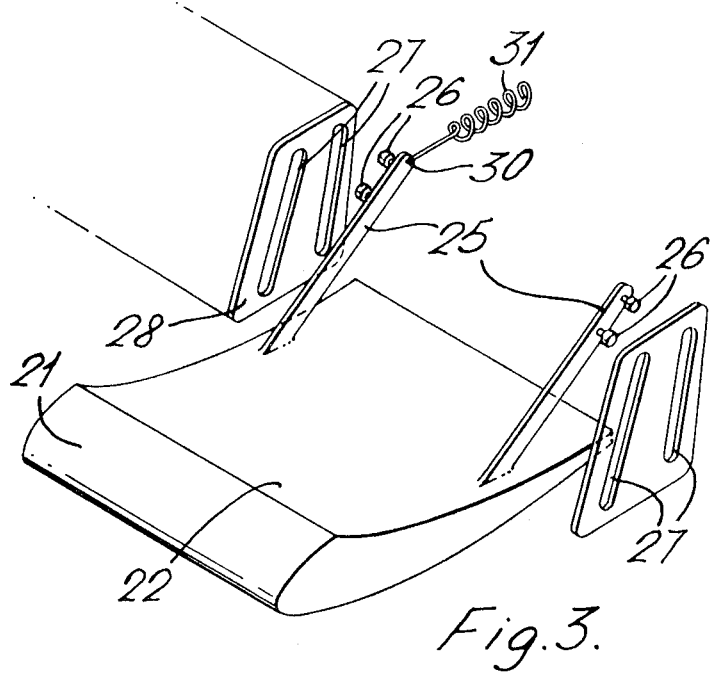

The invention will be described, merely by way of example, with reference to the accompanying drawings, in which:

FIG. 1 is a diagrammatic elevation, partially broken away, of a gas turbine engine having an air intake in accordance with the present invention, FIG. 2 is a somewhat diagrammatic half-section of the air embodiment intake structure in accordance with one embodiment of the present invention, and shown on an enlarged scale relative to FIG. 1, FIG. 3 is a perspective and exploded view of parts of the intake structure shown in FIG. 2, but on an enlarged scale with respect to FIG. 2, FIG. 4 is a half-section of an intake structure in accordance with another preferred embodiment of the present invention, shown in its inoperative condition, and FIG. 5 is a view similar to FIG. 4, but showing the intake structure in its operative position in which the contraction ratio is increased.

Referring to the drawings, FIG. 1 shows a gas turbine power plant 10 of the front fan-type which comprises, as is well known, an annular fan casing 11 having an inner wall 12 and an outer wall 13 in which is mounted a fan rotor 14. The rotor 14 is mounted for rotation on a hub 15 which is drivingly connected with rotary parts (not shown) of a gas generator 16 mounted in a casing 17. In the casing 17 are mounted in axial flow series compressor means, combustion equipment, turbine means and an exhaust assembly. These parts are not shown in the drawing and they do not form part of the invention. The gas generator casing 17 is supported from the fan casing 11 by means of a ring of generally radially extending struts 18.

The upstream end of the fan casing 11 constitutes an air intake 19 for the fan 14 as well as for the gas generator 16.

Referring now to FIGS. 2 and 3, which show one preferred embodiment of an intake structure in accordance with the present invention, it will be immediately appreciated that the upstream end of the fan pod 11 which defines the said intake 19 is formed with a relatively sharp lip 20. The letter A indicates the distance between the highlight point and the throat of the intake shown in the full line position which is the inoperative position of the intake 19 according to this embodiment. The distance A is of course a function of the contraction ratio of the intake.

However, as already discussed above, in certain flight conditions the contraction ratio must be increased to prevent asymmetric intake flows and generally the creation of areas of low pressure within the intake. To achieve this, the lip 20 is in the form of a plurality of circumferentially adjacent and consecutive lip segments 21, and each segment has a curved generally radial downstream surface 22 which is adapted substantially to mate with a complementarily shaped curved surface 23 at the upstream-most face of the remainder of the fan casing 11 which is fixed.

Each lip segment 21 is relatively movable with respect to the fixed fan casing 11 and it is also relatively movable to any of the other lip segments 21. To permit this relative movement, each surface 22 has a pair of struts 25 of equal length extending therefrom (see FIG. 3), each strut 25 carrying a pair of circumferentially spaced freely rotatable rollers 26 mounted so as to face away from the rollers of the other strut 25 on the same surface 22. The rollers 26 are adapted to be received in tracks constituted by slots 27 provided in the side faces of panel members 28. As can be seen, each panel member 28 has two axially spaced slots 27 which extend obliquely with respect to a purely radial line, but the two slots 27 of each panel member 28 lie at different angles thereto, with the forward slot 27 enclosing the larger acute angle therewith. Thus a pair of circumferentially adjacent panel members 28 have facing pairs of slots 27, and the front slots 27 of said members 28 are parallel with each other, as are the rear slots 27. Each strut 25 is provided with one or more fixed lugs 30 at its rear end around which is anchored one end of a coil spring 31 the other end of which is anchored on a lug 32 secured to the outer wall 13 of the fixed portion of the fan casing 11.

If an engine having the intake structure shown in FIGS. 2 and 3 encounters crosswind conditions in flight, then the radially inner side of the lip segment 21 will experience a severe pressure drop compared with the pressure of the ambient air it experiences on its radially outer side. The ambient air will therefore be able to creep between the surfaces 22 and 23 and will work against the biasing action of the coil spring 31 to pivotally move the lip segment 21 from its full line position in FIG. 2 in an upstream as well as in a radially inward direction, this movement being controlled by the rollers 26 and slots 27, until it reaches its position shown in dotted lines.

The reference letter B indicates the vertical distance between the new positions of the highlight point and the throat and it will be seen that the distance B is greater than the distance A which in turn means that the contraction ratio has been increased and the lip has once again assumed a position such as to effectively round off the intake lip inner surface into a bell-mouth shape which will enable the air flow to follow the surface of the intake instead of breaking away and creating asymmetric intake flows.

It will be appreciated that the forward and inward movement of the lip segment 21 will reduce the cross section of the air intake, but this reduction in intake cross section is compensated for by the fact that in moving forwardly and inwardly, the lip segment 21 creates a gap 35 between the said surfaces 22 and 23, this gap 35 serving an an auxiliary intake.

It will therefore be appreciated that by providing a ring of lip segments 21 in which each segment 21 can slide relative to the other, an asymmetric intake may be produced completely automatically and in response only to the relative magnitudes of the ambient air pressure and the static pressure within the intake, and thus this system need not even remotely be connected to pilot controls. Moreover, it will be appreciated that at the other side of the lip, namely the diametrically opposite side, the crosswind will act directly on the inner surface of the intake and there will be no low-pressure area there.

Turning now to another preferred embodiment of the present invention, illustrated in FIGS. 4 and 5, this embodiment illustrates another way in which the contraction ratio of the intake can be adjusted automatically in response to pressure conditions without pilot control. In this embodiment, purely by way of comparison, the chain dotted lines in FIG. 4 show the contour of a conventional lip and it can be seen from the full lines of the actual lip employed that the latter has a much sharper angle. However, as a result the contraction ratio is reduced by an amount which is functionally related to the differences in the distances C and D as shown on that drawing.

In this embodiment the lip 20 is still in the form of a ring of segments 21 and each segment 21 is capable of moving with respect to the remainder, i.e. a fixed portion, of the fan casing 11.

FIGS. 4 and 5 respectively show the normal and crosswind conditions or positions of the lip segments 21. Referring first to FIG. 4, each lip segment 21 is hollow and has a wall 40 adjacent the fixed portion of the fan casing 11. An antiicing pipe is shown at 60.

Mounted within the hollow segment 21 is a rocking piston 41 which is pivoted at 50 and which effectively subdivides the segment into two chambers 43 and 44. The chamber 44 is arranged to communicate with ambient air pressure via one or more openings 46 in the outer wall 13, while the chamber 43 communicates with throat static pressure via an opening 47 in the inner wall 12. If desired, the arrangement could be so modified that the said pressure act only on the part of the piston 41 which is to the right (as viewed) of the pivot 50, while the smaller, left-hand part is separated therefrom and provided with balance pressure derived either from a specially provided compressor bleed or from antiicing air. In any event, the pressures prevailing in the chambers 43 and 44 respectively determine the relative positions of the two limbs 51 and 52 respectively of the rocking piston 41. The end of the limb 51 is rigidly connected to the lip segment 21 one end of which is pivotally connected to one end of a flexible plate 55. The plate 55 is pivotally connected near its other end to a fixed structural member by way of a link 56. The limb 52 of the rocking piston 41 has at its end a seal 57 which is in sealing engagement with the wall 40.

As stated above, FIG. 4 shows the normal or cruise condition in which the air flow is parallel with the central longitudinal line of the intake. In crosswind conditions the throat area will be in the region of extremely low pressure and ambient air pressure will be higher to rock the piston about its pivot 50 so that the limb 51 will lift up and in doing so will lift the front end of the lip segment 21. At the same time the flexible plate 55 will be lifted onto the top of the surface 53 of the fan pod 11, thus allowing for a slight telescoping effect.

As can be seen from FIG. 5, the distance from the highlight point to the throat is now E, which is greater than D of FIG. 4 and is of approximately the same magnitude as the distance C.

It will be appreciated that once again the required increase of the contraction ratio is achieved fully automatically and independently of pilot controls, solely in response to the prevailing pressure conditions.

I claim:

1. An air intake for a gas turbine engine including an upstream lip which is movable relative to a fixed pod member, displaceable pressure-responsive means associated with the said lip and subjected to opposing forces respectively due to the static pressure within the said intake and to ambient air pressure, the displacement of said pressure-responsive means causing movement of said lip to vary the contraction ratio of the said intake automatically and solely in response to the relative magnitudes of said pressures.

2. An intake as claimed in claim 1 wherein the lip is pivotally connected to said fixed pod member for movement between an inoperative position wherein respective adjacent surfaces of the lip and of the fixed pod member are substantially contiguous, and an operative position wherein the lip is moved in an upstream direction with a radially inward component so as simultaneously to increase the said contraction ratio and to form a gap between itself and the fixed pod member, the said gap serving as an auxiliary intake.

3. An intake as claimed in claim 2 wherein the pressure-responsive means is constituted by a generally radially extending surface of the said lip, which surface in said inoperative position is contiguous with a generally radially extending surface of said fixed pod member, there being resilient means for urging the said lip towards its inoperative position.

4. An intake as claimed in claim 3 wherein the pivotal connection between the said lip and the fixed pod member includes a roller and track arrangement, and struts connected between the rollers and the lip.

5. An intake as claimed in claim 4 wherein the resilient means is a spring anchored at one end to said fixed pod member and connected at the other end to a part movable with the rollers.

6. An intake as claimed in claim 1 wherein the lip is associated with a flexible wall and defines within itself a pair of spaces which are respectively subjected in operation to said pressures and which are separated from each other by the pressure-responsive means constituted by a movable piston connected to said flexible wall, whereby movement of said piston in response to a difference in said pressures causes flexing of said flexible wall to change the said contraction ratio.

7. An intake as claimed in claim 6 wherein the said piston is a rocking piston one end of the working face of which is in sealing engagement with a generally radial face of the upstream end of the fixed pod member, while the other end of said working face is connected to said lip.

8. An intake as claimed in claim 1 wherein the lip comprises a plurality of circumferentially adjacent segments which can move relative to one another to permit the intake to assume an asymmetric shape.

* * * * *